INVENTORS
ELMER C. ALIX
HARRY A. WILSON

Patented Dec. 9, 1952

2,620,832

UNITED STATES PATENT OFFICE 2,620,832

SAFETY DEVICE FOR PICKER STICKS

Elmer C. Alix, Charlton City, and Harry A. Wilson, South Spencer, Mass.

Application February 17, 1950, Serial No. 144,816

3 Claims. (Cl. 139—156)

This invention relates to safety devices for the picker stick of looms and has particular reference to the provision of a safety stud to which the picker stick is pivotally connected and novel method of making the same.

One of the principal objects of the invention is to provide a safety device, for preventing breakage of the picker sticks, shuttle boxes, lug straps, sweep sticks, sweep arm, and rocker iron or their associated parts of the loom, in the form of a safety stud to which the picker stick is pivotally connected and so constructed and formed as to be resistant to breakage under normal conditions of use but which will readily shear or break under abnormal conditions of use, as for example when the picker stick is prevented from performing its normal motion in freely propelling a shuttle transversely of the lay of the loom.

Another object is to provide a safety stud, in the form of a pivot pin to which the picker stick is pivotally attached, formed of a close grain cast iron or similar material having a weakened section controlled according to the shear resistance desired of said pin under normal conditions of use, which pin and associated parts are so formed as to permit ready replacement of the pin in case of breakage thereof without altering or in any way affecting the adjustment of the sweep of the picker stick.

Other objects and advantages of the invention will become apparent from the following description taken in connection with the accompanying drawings, and it will be apparent that many changes may be made in the details of construction and method of making the same without departing from the spirit of the invention as expressed in the accompanying claims. The invention, therefore, is not to be limited to the exact details of construction and method shown and described as the preferred forms only have been given by way of illustration.

Several different attempts have been made in the past to provide a safety device for preventing breakage of the picker sticks, shuttle boxes, lug straps, sweep sticks, sweep arm, and rocker iron and other associated parts of the loom when the picker stick is prevented from performing its normal function. Such prior art devices, in most instances, were quite complicated and expensive in construction, and in most instances disrupted the operation of the loom for a considerable length of time due to the necessity of replacement of parts and the time required for such replacements and due mostly to the loss of adjustment of the sweep of the picker stick. The present invention, therefore, is directed particularly to the provision of a simple and efficient arrangement which is extremely efficient in its function, in no way alters the adjustment of the sweep of the picker stick and is extremely inexpensive in its nature and readily replaceable with little loss of time.

Referring to the drawings.

Figures 1, 2, 3:
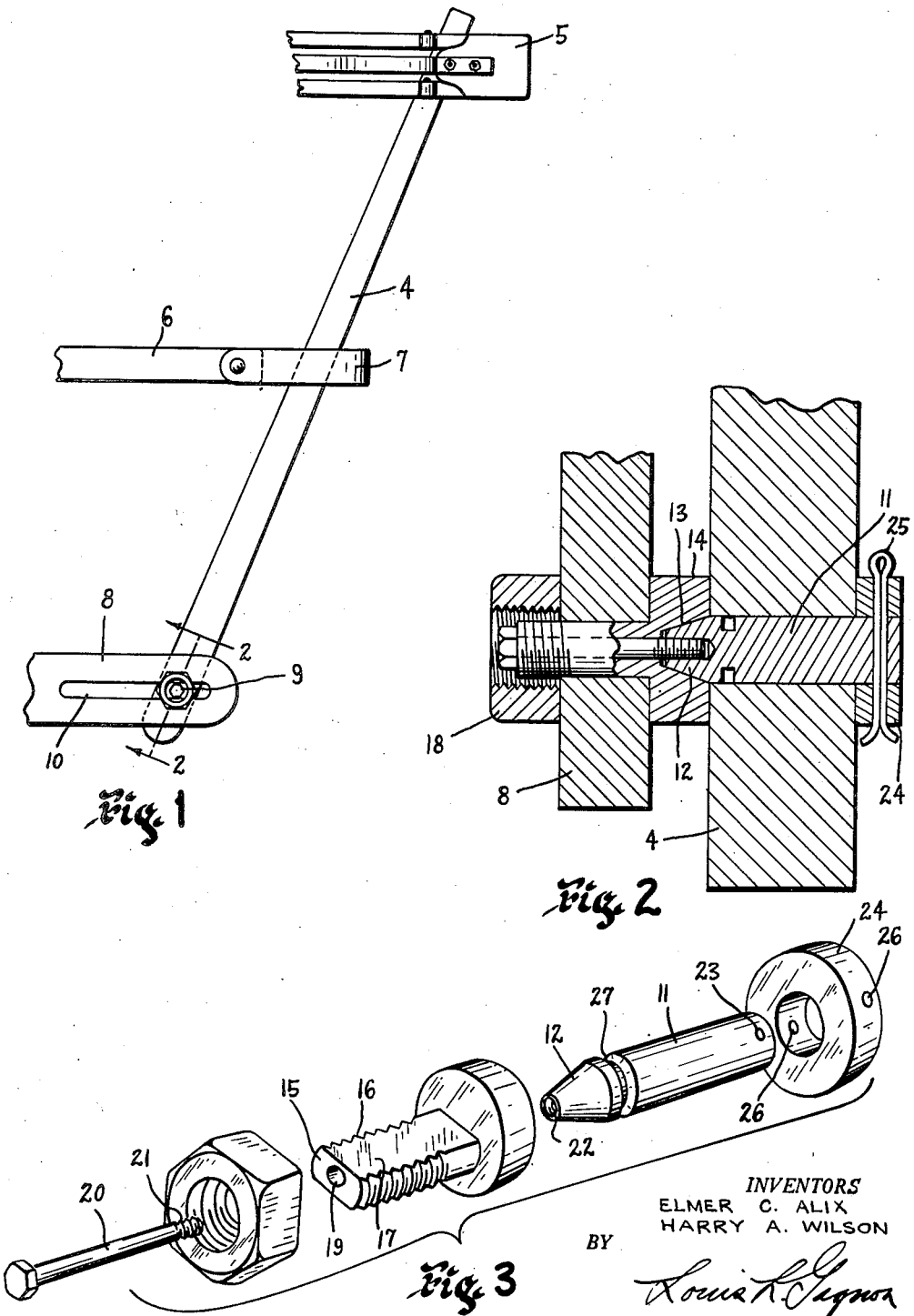
Fig. 1 is a fragmentary side elevational view of a picker stick and its associated parts of the loom and illustrating the use of the device embodying the invention.
Fig. 2 is an enlarged sectional view taken as on line 2—2 of Fig. 1 and looking in the direction indicated by the arrows.
Fig. 3 is an exploded perspective view of the device embodying the invention and showing its novel related parts.

Referring to the drawings wherein like numerals refer to like parts through the several views, in Fig. 1 there is diagrammatically illustrated a picker stick 4 associated with a shuttle box 5 and sweep stick 6 having a conventional lug strap 7 normally used with such devices. The picker stick 4 is pivotally connected with the rocker arm 8 by the assembly 9 embodying the invention, which assembly may be adjusted to any desired location longitudinally of a conventional slot 10 formed in the rocker arm 8 for adjusting the sweep of the picker stick.

Referring to Figs. 2 and 3, the device embodying the invention comprises a pin 11 formed preferably of close grain cast iron. The pin 11 is provided adjacent one end thereof with a cone shaped portion 12 adapted to fit within a cone shaped recess 13 formed in an enlarged spacer portion 14 having an integral stud 15 thereon. The stud 15 is formed with a threaded portion 16 and opposed flattened sides 17 adapted to extend through the slot 10 in the rocker arm 8. The threaded portion 16 is adapted to receive a clamp nut 18 by which the spacer member 14 may be rigidly secured in any desired adjusted position longitudinally of the slot 10 to control the sweep of the picker stick.

The stud 15 has a longitudinal opening 19 therein through which a bolt 20 is adapted to extend. The said bolt 20 is provided with a threaded portion 21 adapted to be threadedly connected with the pin 11 internally of a threaded bore 22 provided in the cone shaped end 12. The pin 11 is provided with an opening 23 adjacent its end opposed to the cone shaped end 12 and is adapted to receive a washer-like member 24 and to be held in connected relation with the pin 11 by a cotter pin or the like 25 which extends through aligned openings 26 in said washer-like member and through the opening 23.

It is to be understood that the washer 24 may be secured to the pin by a suitable set screw or the like, as desired. The function of the washer 24 is merely that of retaining the picker stick 4 on the pin 11 whereby the said picker stick is pivotally connected with the rocker arm.

In order to control the shearing action of the pin 11 or its resistance to breakage, a circumferential groove 27 is formed adjacent the cone shaped end 12. Due to the presence of this groove and to the shearing characteristics of the close grain cast iron, the said pin may be made to be of any desired resistance to breakage or shearing depending upon the stress which it is designed to oppose. By varying the depth of the groove, this shearing action may be varied, as desired.

The intended function of the device is that if the picker stick should be resisted in any manner against free sweeping movement, the pin 11 will shear or break rather than to cause damage to any of the associated parts of the loom. In instance when the pin does shear or break under such conditions, the error may be readily rectified without in any way damaging the loom and little time is required in replacing the pin 11 in the spacer member 14. The cone shaped recess in the spacer member 14 and cone shaped end of the pin provide means whereby the pin may be quickly assembled with the spacer member and associated parts and held in proper axial alignment. The said cone shaped end also enables the remaining portion of the broken pin to be readily detached from its associated part.

Although it has been specified that the pin 11 is preferably formed of a close grain cast iron, it is to be understood that any other suitable material having substantially the same characteristics may be used.

From the foregoing description, it will be seen that simple, efficient and economical means and method have been provided for accomplishing all of the objects and advantages of the invention.

Having described the invention, what is claimed is:

1. A safety device for pivotally connecting a picker stick to a rocker arm of a loom, said picker stick having an aperture therein and said rocker arm having a slot therein, comprising a member having a tapered recess in the exposed end thereof and a reduced threaded portion on its opposite end adapted to extend through the slot in the rocker arm, means threaded to said reduced threaded portion for securing said member to said rocker arm, said reduced threaded portion having an internal longitudinal bore communicating with the tapered recess in said member, a pivot pin having a tapered end shaped to fit within said tapered recess and having a threaded bore in said tapered end and a groove in a side thereof adjacent said tapered end formed in accordance with the shear resistance desired of the pin, a threaded bolt extending through the hollow bore of the reduced threaded portion threadedly connected with the threaded bore in the tapered end of the pin to secure said tapered end in said tapered recess, said pivot pin being adapted to extend through the aperture in the picker stick and means for pivotally retaining said picker stick on said pin.

2. A safety device for pivotally connecting a picker stick to a rocker arm of a loom, said picker stick having an aperture therein and said rocker arm having a longitudinally slotted portion, comprising a member having a tapered recess in the exposed end thereof and a reduced threaded portion having opposed flattened sides on its opposite end adapted to extend through the slotted portion in the rocker arm, means threaded to said reduced threaded portion for securing said member to said rocker arm, said reduced threaded portion having an internal longitudinal bore communicating with the tapered recess in said member, a pivot pin having a tapered end shaped to fit within said tapered recess and having a threaded bore in said tapered end and a circumferential groove therein adjacent said tapered end formed in accordance with the shear resistance desired of the pin, a threaded bolt extending through the hollow bore of the reduced threaded portion threadedly connected with the threaded bore in the tapered end of the pin to secure said tapered end in said tapered recess, said pivot pin being adapted to extend through the aperture in the picker stick and means for pivotally retaining said picker stick on said pin.

3. A safety device for pivotally connecting a picker stick to a rocker arm of a loom, said picker stick having an aperture therein and said rocker arm having a slot therein, comprising a spacer member having a tapered recess in the exposed end thereof and a reduced threaded portion on its opposite end adapted to extend through the slot in the rocker arm with said spacer member overlying a side surface of the arm, means threaded to said reduced threaded portion for securing said spacer member to said rocker arm, said reduced threaded portion having an internal longitudinal bore communicating with the tapered recess in said member, a pivot pin having a tapered end shaped to fit within said tapered recess and having a threaded bore in said tapered end and a circumferential groove therein adjacent said tapered end formed in accordance with the shear resistance desired of the pin, a threaded bolt extending through the hollow bore of the reduced threaded portion threadedly connected with the threaded bore in the tapered end of the pin to secure said tapered end in said tapered recess, said pivot pin being adapted to extend through the aperture in the picker stick with the spacer member lying between said stick and rocker arm, and means for pivotally retaining said picker stick on said pin.

ELMER C. ALIX.
HARRY A. WILSON.

REFERENCES CITED

The following references are of record in the file of this patent:

UNITED STATES PATENTS

| Number | Name | Date |
|---|---|---|
| 742,695 | Marcy | Oct. 27, 1903 |
| 1,183,620 | Biggert, Jr. | May 16, 1916 |
| 1,488,532 | Douglass | Apr. 1, 1924 |
| 2,057,409 | Bergstrom et al. | Oct. 13, 1936 |
| 2,438,676 | Nickle et al. | Mar. 30, 1948 |